United States Patent
Witt et al.

(10) Patent No.: US 7,694,134 B2
(45) Date of Patent: Apr. 6, 2010

(54) SYSTEM AND METHOD FOR ENCRYPTING DATA WITHOUT REGARD TO APPLICATION

(75) Inventors: Russell A. Witt, Plano, TX (US);
Timothy R. Bruce, Carrollton, TX (US);
David L. Helsley, Glastonbury, CT (US);
Osvaldo A. Ridner, Folsom, CA (US);
John M. Casey, Carrollton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 1023 days.

(21) Appl. No.: 11/406,175

(22) Filed: Apr. 18, 2006

(65) Prior Publication Data

US 2007/0113078 A1   May 17, 2007

Related U.S. Application Data

(60) Provisional application No. 60/735,531, filed on Nov. 11, 2005.

(51) Int. Cl.
*H04L 29/06* (2006.01)
*G06F 11/30* (2006.01)
*G06F 12/14* (2006.01)
*G06F 17/30* (2006.01)

(52) U.S. Cl. .................... 713/165; 713/193; 726/26

(58) Field of Classification Search ............. 713/193, 713/165; 726/26
See application file for complete search history.

(56) References Cited

U.S. PATENT DOCUMENTS

| 5,796,825 | A | 8/1998 | McDonnal et al. ............. 380/4 |
|---|---|---|---|
| 6,249,866 | B1 | 6/2001 | Brundrett et al. ............. 713/165 |
| 7,484,245 | B1* | 1/2009 | Friedman et al. ............... 726/27 |
| 2003/0091186 | A1* | 5/2003 | Fontijn et al. ................. 380/201 |
| 2004/0059912 | A1 | 3/2004 | Zizzi ........................... 713/165 |
| 2004/0078568 | A1* | 4/2004 | Pham et al. ................... 713/165 |
| 2004/0190722 | A1* | 9/2004 | Grobman ..................... 380/277 |
| 2005/0091487 | A1* | 4/2005 | Cross et al. ................... 713/165 |
| 2005/0246778 | A1 | 11/2005 | Usov et al. ..................... 726/28 |
| 2005/0254645 | A1* | 11/2005 | Shippy et al. .................. 380/28 |
| 2007/0014403 | A1* | 1/2007 | Loo et al. .................... 380/201 |

OTHER PUBLICATIONS

Dowdeswell, Roland C. et al. "The CryptoGraphic Disk Driver". In Proceedings of the Annual USENIX Technical Conference, FREENIX Track , 2003.*
Wright, Charles P. "Operating System Support for Extensible Secure File Systems", 2004.*
PCT Notification of Transmittal of the International Search Report with attached PCT International Search Report and Written Opinion of the International Searching Authority in International Application No. PCT/US2006/043812 filed Nov. 9, 2006 (10 pages), Mailed Feb. 27, 2007.

* cited by examiner

*Primary Examiner*—Michael J Simitoski
(74) *Attorney, Agent, or Firm*—Baker Botts L.L.P.

(57) ABSTRACT

Systems and methods are provided for encrypting data without regard to applications writing the data to, or reading the data from, encrypted data storage devices. An operating system intercept detects information indicating that a file will be encrypted and, in respond, sets device-level flags indicating encryption and also establishes one or more encryption keys to be used in the encryption process. A second intercept detects an input/output event and, in response, calls an encryption application to encrypt (or decrypt) the data before it is written to (or read from) the data storage device.

21 Claims, 2 Drawing Sheets

SYSTEM AND METHOD FOR ENCRYPTING DATA WITHOUT REGARD TO APPLICATION

CROSS-REFERENCE TO RELATED APPLICATIONS

This application claims the benefit of priority under 35 U.S.C. §119(e) of U.S. Provisional Application Ser. No. 60/735,531 filed Nov. 11, 2005.

TECHNICAL FIELD OF THE INVENTION

This invention relates generally to data encryption and, more particularly, to a system and method for encrypting data without regard to applications which may read or write the data.

BACKGROUND OF THE INVENTION

Storage management generally concerns managing data on storage media, such as tape and disk devices. Data on a storage medium, such as a tape, may be lost (e.g., either while at a disaster recovery site or in-transit from one data center to another). While tapes have commonly been lost when in transit or misplaced and misfiled at disaster recovery sites, recent change in laws requires public disclosure when the lost data might be related to individual financial or medical information. These public disclosure requirements have forced many companies to attempt to better protect all data that is not stored in the secure data center.

Certain products, such as backup products for example, have started to address encryption. However, with these products, the encryption of data (and its later decryption for reading) is interdependent upon the application being used to encrypt the data.

Certain products allow data to be copied from tape (or disk) to another tape in an encrypted form. So, if a simple application writes a two-volume tape file; then this application can copy that file (or files) to another two-volume tape file in an encrypted form. Then, to read the data, the encrypted two-volume tape file would have to be re-copied and un-encrypted back onto a two-volume tape file that is not encrypted. Then, the application could read the un-encrypted two-volume tape file as input. This means writing the data twice and reading the data twice and keeping track of the file name and relationship between the original data, the encrypted copy, and the un-encrypted copy.

SUMMARY

Various embodiments generally provide systems and methods for encrypting files without regard for the application creating or writing the file and without regard for the volume (e.g., real or virtual) that the file is being created or written upon. While certain embodiments may refer to the use of tapes as a storage medium, the concepts described herein may also be applied to other storage media, such as disks.

In one embodiment a method of encrypting data is provided. One step is determining whether a data storage device will have one or more encrypted files. Another step is setting one or more data storage device-level flags to indicate that the data storage device will have one or more encrypted files. Another step is monitoring an operating system associated with the data storage device for a first input/output event associated with the data storage device. Another step is, if a first input/output event associated with the data storage device occurs, using a second intercept to recognize the input/output event and initiate encryption of data being written to the data storage device. Another step is encrypting the data. Another step is storing the encrypted data on the data storage device.

In another embodiment, a data encryption system is provided. The system includes, an operating system, an encryption application for encrypting data, and an encryption utility operable to determine whether a data storage device will have one or more encrypted files. The encryption utility is further operable to issue a first intercept, which is operable to set one or more data storage device-level flags to indicate that the data storage device will have one or more encrypted files. The system further includes a monitoring module operable to monitor the operating system for a first input/output event associated with the data storage device. The encryption utility is further operable to issue a second intercept, which is operable to recognize the input/output event and initiate encryption of data being written to the data storage device. The encryption application encrypts data after the second intercept recognizes the input/output event and before the data is stored on the data storage device.

Certain embodiments may provide certain advantages, some of which are indicated below. It should be understood that any particular embodiment may provide some, none, or all of the described advantages. One advantage is the provision of secure data on transportable data storage devices. Another advantage is the ability to encrypt or decrypt data without regard to the application writing data to, or reading data from, the encrypted data storage device.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Figure 1:
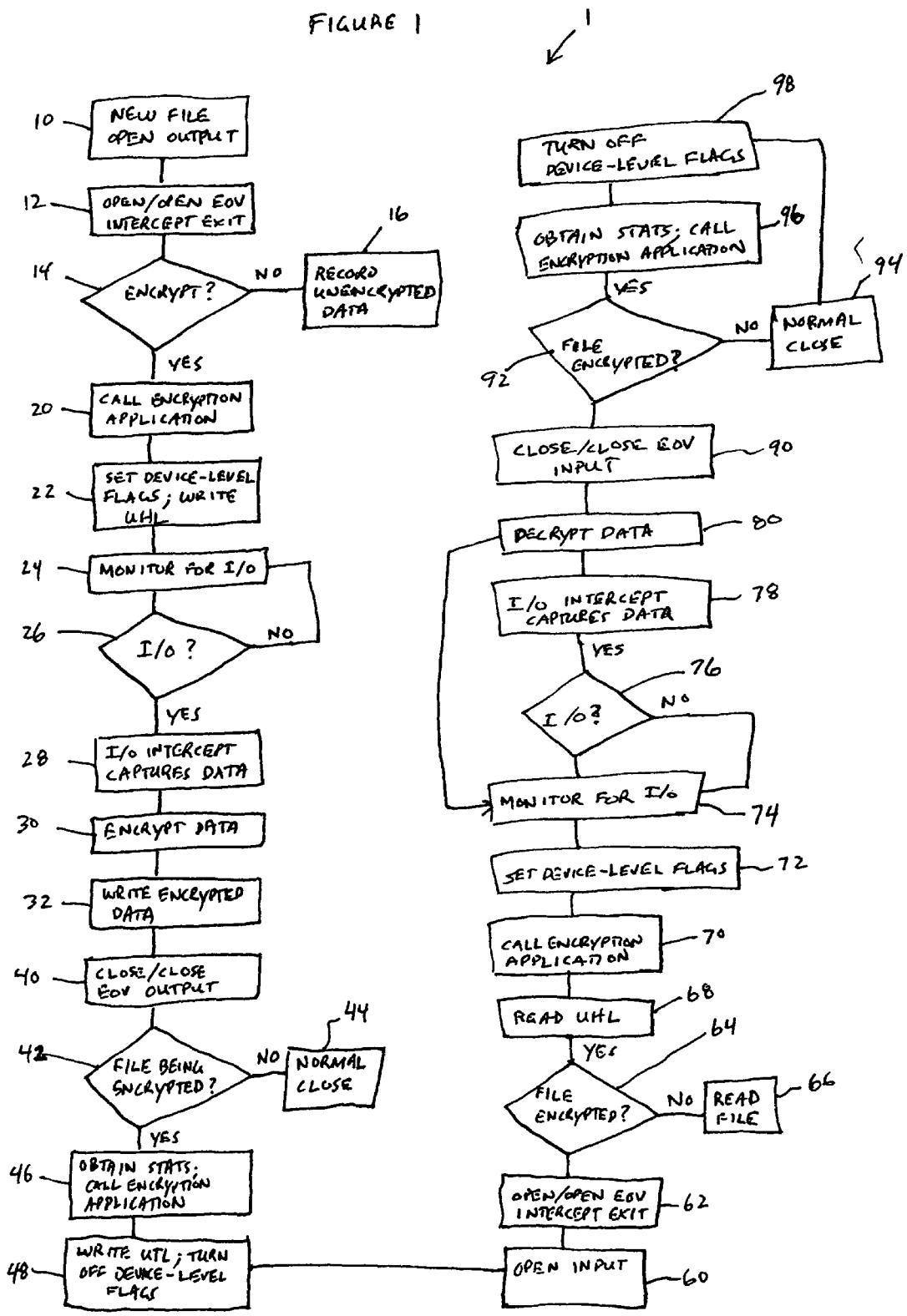
FIG. 1 illustrates an example method of data encryption and storage in accordance with an embodiment of the present invention.

Various embodiments generally provide systems and methods for encrypting files without regard for the application creating or writing the file and without regard for the volume (e.g., real or virtual) that the file is being created or written upon.

While some specific products, such as backup products for example, have started to address encryption, this is only a partial solution. Data centers need the ability to have any application that writes data on a storage medium, such as tape, to have the data encrypted without regard for the application writing the data. Because one of the main reasons for putting the data on tape is its easy portability (tapes may be written at one data center and shipped to another data center with a high confidence that the second center will have a device capable of reading the tape), the encryption process should not be limited to one type of reading device (e.g., a particular tape drive) that may or may not be available at all other data centers.

What is needed is a system to allow any application that writes any file to a storage medium, such as a tape, to be able to have the data encrypted without regard for the application writing the data and without regard for the type of device being written to.

In one embodiment, the problem of lost or mishandled mainframe tapes, or other storage media, is addressed through the use of encryption technology that executes an encryption process at the device level to encrypt and decrypt data. The system uses software, rather than hardware, for firmware. The result is that any customer application can instantly begin generating encrypted data storage devices without having to modify the application or add additional processing steps to the application. Further, by separating the encryption and decryption mechanisms into cost options and no-cost options respectively, it is possible for every customer data encryption site to easily participate in the exchange of encrypted data. For sites that only need to read encrypted media, this can be done so at no cost in terms of getting a license for the base encryption software.

An example method, among other things, employs randomly-generated keys in encrypting tape data sets. In one scenario, the method incorporates two modes. A first mode is provided for in-house tapes that will only be used within a primary data center or a disaster-recovery center. A second mode is provided for tapes being used to transfer data between two separate businesses (e.g., in a B2B situation) or between two separate data centers of the same enterprise. The randomly-generated keys may be used for differing types of encryption applications and preferably support either 16-, 24- or 32-byte encryption services.

For tapes encrypted for in-house use (i.e., the first mode), the encryption dataset is the only place where the encryption key itself is stored. All references to the encryption key are preferably via a 64-byte key label that is stored in the encryption system database and itself referenced by an 1-32 byte encryption token name and/or a 4-byte key index values. It should be understood that these are examples only, and the lengths of the respective designators (e.g., key labels, token names, and key index values) are not so limited.

Preferably, under this example configuration, when tapes need to be decrypted outside of a data center that performed the encryption (e.g., at a disaster recovery center), the encryption dataset is restored first and an encryption application is started prior to an attempt to read any tapes encrypted with by the encryption system. While a new randomly-generated key may be created on a periodic basis (e.g., weekly, monthly, yearly, etc.), these new keys are generated in advance and saved in the encryption system database and the encryption dataset. Thus, even if the backup of the encryption system database and the backup of the encryption dataset are two weeks old at the disaster recovery site; they are still usable for tapes created the same day. In fact, by having the 64-byte key label itself stored in a user label on the storage medium, (e.g., the user header label of a tape), the storage medium can be read without having the encryption database restored (but the encryption dataset would be required as well as having the encryption application active at the disaster recovery location).

An example method 1 is illustrated in FIG. 1. At step 10, an OPEN process is initiated. At step 12, when a new tape file is being created, a first intercept, which is an operating system intercept get control of the open process. This first intercept may actually comprise more than one intercept. At step 14, this intercept checks to see if the file being created needs to be encrypted or not. This determination may be made based on one or more predetermined and/or preset file and/or device parameters (e.g., such as file name, job name, etc.). At step 16, if the file does not need to be encrypted, then the unencrypted data is written to the storage device, and the method ends. If the file needs to be encrypted, then at step 22, one or more flags are set at the device level to indicate that I/O to this device (e.g., storage medium, such as tape) needs to be processed through an encryption process and which encryption key should be used.

At step 24, the system monitors for I/O. When actual I/O to the device takes place, then at step 28 a second intercept takes control and tests to see if the file needs to be encrypted. Preferably, the second intercept is a very low-level intercept that will get control on each and every I/O to the device. If the file is to be encrypted, then at step 30, the second intercept will use the specified key and causes the encryption application to encrypt the data before it is written to device. Then, at step 32, the encrypted data is written to the device. At step 22, an encryption indicator (e.g., a token) is stored. This may be stored, for example, in a user label second on the storage device. For instance, the encryption token may be stored in the user header labels created with each file. The token indicates that the file is encrypted and also indicates name of the key used to encrypt the data. The token may include additional information about the encryption application, the data, the file, and/or the storage device.

At step 60, the system monitors for a OPEN/READ request or instruction. If an existing encrypted file is opened for input (read) processing, then at step 62 the first operating system intercept again takes control. This intercept analyzes the tape labels of the file being opened to determine if the file was encrypted and which key was used. It then makes a test call to the encryption services to determine if the token is defined and if the data stored in the tape labels can be successfully decrypted (thus checking that the correct token is being used). If so, then at step 72, the intercept again sets flags at the device level to indicate that decryption services are required and to indicate the name of the token to use to decrypt the tape file.

At step 74, the system monitors for actual I/O (Read) instructions. At step 78, when the actual I/O to the device takes place, the second low-level I/O intercept again takes control. This time, at step 80, the second intercept causes the encryption application to decrypt the data as it is read from the tape device and before the I/O buffer is returned to the actual application reading the tape file. The method then ends at step 98.

The actual check to see if a file being created needs to be created with encryption or not can be based on many criteria. For a z/OS product, for example, an existing system called SMS may be used. This system (SMS) already exists on all z/OS operating systems and has the ability to group files by file name, creating job name, and many other criteria. The groupings may be used as the parameters by which the encryption system checks a file to determine whether encryption/decryption is needed.

According to a feature of certain embodiments, an administration utility may be provided that allows the creation of an encryption key based on a pass phrase. The utility allows this encryption key to be stored in a secure file, referenced only by a token. This prevents anyone from ever seeing the actual encryption key, but use of the same pass phrase will allow the same encryption key to be regenerated (e.g., at a different data center or disaster recovery location).

Figure 2:
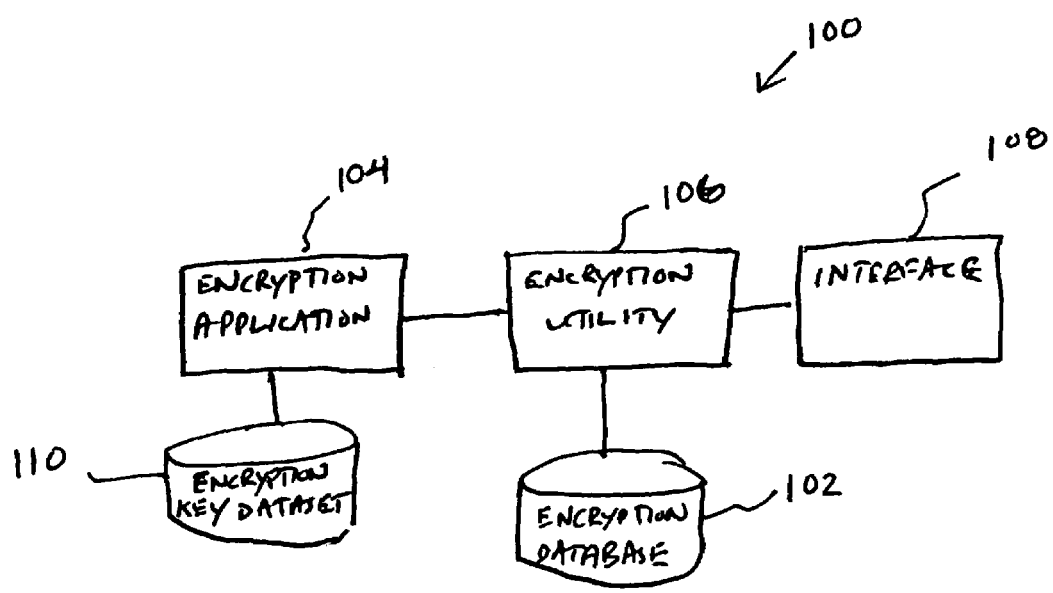
FIG. 2 illustrates an example system for encrypting and storing data in accordance with an embodiment of the present invention.

An example encryption system is illustrated in FIG. 2. System 100 includes an encryption application 104 and an encryption database 102. The encryption application may be an application incorporating any suitable encryption algorithm(s). The algorithm(s) may depend, for example, on the types of files being created, the types of storage media being used, and the purposes of the encrypted data. The encryption database 102 may include any suitable database. Particular example databases are discussed herein. However, various embodiments are not limited to these particular databases.

Database 102 may be used for, among other things, storing encryption keys and/or encryption tokens.

System 100 also includes an encryption utility 106, which may be coupled to both the encryption application 104 and the encryption database 102. Encryption application 104 may have one or more encryption datasets 110 which may be used for, among other things, storing encryption tokens and/or encryption keys.

Preferably, encryption database 102 is operable to handle the merging and separating of data centers by employing a key table structure. In a simple environment there is one key table with a default name. This one table is the primary table and is used for all encryptions performed in the data center. If two data centers merge, the key table is exported from one system and imported into the other system. The imported key table is referenced for decrypting tapes that were merged into the data center. The original key table is the primary table and any new encrypting is done based on the original key table. Thus, each key table can contain a key with the same key name, but whose encryption key is different.

The key table name and the key name are preferably stored on the storage medium (e.g., tape). The exact size of the key, therefore, is not limited by the free space in the header label. This allows one to define varying encryption strengths depending on the locale of the relevant data center and international legal restrictions. It also removes all traces of the underlying encryption key from the data that has been encrypted with it. This methodology also then allows the encryption to be controlled at the file level, not the volume level. Thus, for example, files 1 and 3 could be encrypted, but not file 2.

Also, the full 64-byte encryption application key label itself may be stored in the tape's user header label. This allows the tape to be read even if the encryption system database is not present by allowing the encryption address space to use the encryption dataset token name directly from the tape. Statistics might be lost in this situation, but the tape could be used for input processing.

In this embodiment, an Encryption Control Block is built for each tape unit the first time that unit is actually used. The control block is built and chained to the other Encryption Control Blocks by the dynamically-installed OPEN/CLOSED/EOV exit during an OPEN process. Once the Encryption Control Block is built and anchored (or found in the chain if this is not the first OPEN) it will be anchored off the Unit Control Block (UCB) as well. The control block is updated to indicate if encryption/decryption services are required or not. This way, the intercept that receives control for every I/O to the device will be able to spend only a few instructions to obtain this control block (from its anchor point in the UCB itself) and determine if its services are required or not. If not, then the I/O will be able to continue with only a few lines of additional code to slow it down. If encryption/decryption services are required, then the intercept issues the calls to an encryption application 104 to actually perform the encryption or decryption and allow the I/O to complete and save any stats in the control block as it progresses. During CLOSE processing for the file, another OPEN/CLOSE/EOV exit clears the control block and passes along to an encryption utility 106 any stats that were saved in the control block by the intercept exit.

Thus, an Encryption Control Block acts as the primary means for communicating between the OPEN/CLOSE/EOV exits and the encryption address space(s) and the I/O intercepts. The OPEN/CLOSE/EOV exits act as the middle-man between the I/O intercepts and the encryption address space. For example, during OPEN-OUTPUT processing, the OPEN/CLOSE/EOV exit will obtain the DATACLASS name, look it up in SMS to see if encryption services are required, and, if so, communicates with the encryption address space to obtain the 64-byte encryption key label and other encryption options that should be used to encrypt the data. This is then stored in the ENCRYPTION CONTROL BLOCK. The I/O intercept would simply use this area stored in the control block to call encryption application services and keep a running total of bytes processed in the Control Block. Then, when the file is closed, the CLOSE exit would retrieve the statistics from the Control Block and pass them back to the encryption address space to be posted.

Since the UCB extension area will be cleared when a tape is mounted/dismounted, it is preferable that the OPEN/CLOSE/EOV exit re-anchors the control block in the UCB extension during all OPEN and OPEN-EOV events. For this reason, the Encryption Control Blocks are also chained to each other. This way, they will always be present after the first time a UCB is used, and simply re-anchored in the UCB during each OPEN process. However, another intercept will get control during VARY-OFFLINE processing to delete these control blocks from the chain of Encryption Control Blocks. This allows for the method to completely free up unused BESUCEs. Only as many Encryption Control Blocks are allocated and chained as there are active UCBs on the system.

The encryption utility 106 takes any stats and updates the encryption database 102 as necessary. The encryption utility 106 may also act as a middle-man between the intercept exit and encryption application 104 and may also have an online interface to allow the creation and maintenance of the encryption database.

In the example embodiment, the encryption system provides a way of creating an encryption key from a pass phrase and allows a user to assign a logical name to that key. The user uses an interface 108 to enter a pass phrase and a key name to associate with the resulting key. New keys entered via this interface are stored in the primary key table of the encryption database 102, but may be directed to a key table other than the primary table for the purpose of reading tapes from other encryption applications/systems. Key tables other than the primary key table are preferably used to decipher only, so imported key tables or keys entered through the encryption system interface 108 but directed to a table other than the primary are considered to be for decryption purposes only. Keys stored in the primary key table may be used for both creating and reading encrypted tapes. There is also a 2-byte sequence number associated with each key-name/key-table pair in the rare situation where a merge of multiple sites have the same pair of key-name/key-table. In this situation, each would have a unique sequence number. The pass phrase itself may be encrypted before being sent to the encryption utility 106. This prevents the original pass phrase from ever being in clear-text while on a network. The encryption used to communicate between the interface and the encryption utility may be either the public/private key (if available) or encrypted using a unique encryption.

The encryption application 104 is called to generate an encryption key using the pass phrase, and an encryption key label is generated to be associated with the encryption key in an encryption key dataset 110. System 100 then passes the encryption key or some derivation back to the encryption application 104 as an encryption/decryption key and gets it converted to an internal encryption token. The encryption application 104 is also called to store the internal token in the encryption key dataset 110 using the key label as the record's "handle." The system preferably does this multiple times with the same encryption key (e.g., once for each of the different types of encryption that is supported).

The key name and the associated encryption key labels are passed to the encryption utility 106 where they are assigned a unique key ID number. The key ID number may be used by a tape management system (not shown) as a space saving shortcut to the key table and key name relationship, and uniquely identifies a given key across all key tables. All of this is stored in the encryption database. The pass phrase is not stored anywhere, and the encryption key derived from that pass phrase is only stored in the encryption key dataset 110 where it is encrypted under the user's encryption master key.

An example encryption database layout is provided below:

| Field name | size | Usage |
|---|---|---|
| Key-name | 8 | Basic name of the encryption name |
| Table-name | 8 | Usually defaults to the sysplex name |
| Sequence # | 2 | To handle rare situation where key-name and table-name are duplicated on a merge |
| Key-id | 2 | Unique number assigned to each entry |
| C-date | 4 | Date the key was created and added to the Cipher database |
| C-time | 4 | Time the key was created |
| C-user | 8 | Userid of the person that originally created this key |
| Retired-flag | 1 | Flag to indicate the key has been retired and should only be used for un-encryption |
| Eligible to be deleted | 1 | Flag that indicates that after the retired-flag has been turned on; the Tape Management System has been reviewed and no usages of this key were found. |
| Number of key-label cells | 1 | The number of key-label cells that will follow this field |
| — | — | The following 10 fields make up a single cell and are repeated as often as necessary. |
| Key-label-type | 8 | The type of key-label that will follow; DES64, AES256 are examples. |
| Key-label | 64 | Actual key-label stored in the CKDS by ICSF |
| Files-in | 4 | Number of files un-encrypted |
| L-date-in | 4 | Date this specific key was last used for encryption |
| L-time-in | 4 | Time this specific key was last used for encryption |
| Usage-in | 16 | Total number of K-bytes encrypted with this key |
| Time-spent-i | 16 | Time spent doing encryption with this key |
| Files-out | 4 | Number of files encrypted |
| L-date-out | 4 | Date this specific key was last used for decryption |
| L-time-out | 4 | Time this specific key was last used for decryption |
| Usage-out | 16 | Total number of K-bytes decrypted with this key |
| Time-spent-o | 16 | Time spend doing decryption with this key |

The last ten fields, for example, may be repeated multiple times, depending on how many types of encryption keys are being supported.

The online interface and encryption interface may also be able to perform lookups and simple inquiries to see how often each key has been used and other statistics. Also, the ability to "RETIRE" a key and to "DELETE" an already retired and un-used key may be provided via these components.

When a tape file is created, a new tape-exit intercept gets control. There, a decision based on information corresponding to the dataset being created is made to determine if the file should be encrypted and what encryption method should be used. If encryption services are required, then the low-level I/O intercept modifies the header, end-of-file, and/or end-of-volume records (e.g., HDR1, EOF1, and E0V1) to indicate that user header and/or trailer labels are present. The TEP OPEN exit will dynamically write the data from the Encryption Utility (106) in 76-byte blocks in the user header labels and user trailer labels. Also, an encryption system unique identifier may be stored in the tape management system. Thus, if the file does need to be encrypted, then the key name and table name are stored in the header along with a 1 or 2-byte indicator as to the type of encryption used and a 1-byte indicator to tell which version of encryption was used. The table-name (8-bytes) may be stored in an encrypted format. This allows for confirmation that the correct key is being used during the un-encryption phase (when read for input) prior to the data being passed to the application. OPEN then performs setup functions for the subsequent encryption of the data to follow.

If the file needs to be encrypted for B2B purposes, then a new encryption key is generated. Once generated, the encryption key label will be saved within the encryption system database for a short period of time (to allow MOD processing within a predetermined time of creation and to allow the file to be read as input within a predetermined time of creation). A second process of the original randomly-generated key is to encrypt it with the PUBLIC key of the company/division that will receive the storage medium. This results in a large (64-256 bytes) encrypted key. This encrypted key is then stored in the user header labels behind the data headers of the storage medium (and behind the end-of-file labels, such as EOF1/EOF2 and the end-of-volume labels, such as EOV1/EOV2). This will be used to read the tape at a different data center location on the assumption that the PRIVATE key is available to decrypt this encrypted key.

During OPEN, the tape-intercept queries the SMS system to determine if encryption is desired, and if encryption is desired what key name and type of encryption is desired. For example, the SMS DATACLAS descriptor field might contain something like "CYPHER=(keyname,AES128)". This would indicate that encryption is desired, the key name specified should be used, and the type of encryption desired is AES 128-bit encryption.

If encryption is to be performed, then the encryption utility calls the encryption application to retrieve the internal token. The encryption application returns the key table, the key name, the key ID and the token to be used. The OPEN intercept then acquires the buffer(s) needed for encryption and updates an encryption control block containing pointer(s) to the buffers(s), the internal token to be used in the encryption process, and any other pertinent information required by the encryption process. Also, the encryption utility will update the statistics for the key name to reflect another usage of this key.

If the tape management system is one of certain enterprise systems, then the encryption system OPEN exit calls the respective management system with information to allow the encryption key index to be stored. If an OEM tape management system is present, then the OPEN exit will simply return to the caller of the OPEN exit the same encryption system key index to allow the OEM tape management system to store within their database.

The encryption system OPEN exit copies 608 bytes from the Encryption Utility 106 into eight user header labels on the tape (eight records with 76 bytes of user data in each record.

The tape management exit is called to pass the key table, key name, key ID, and other information. The tape products store the key ID in their respective databases.

Before allowing the OPEN process to complete, .the key name (8-bytes), the key table (8-bytes encrypted), the encryption version number (1-byte) and an indicator as to the type of encryption used (1 or 2-bytes) will be stored in the user header. These 19-20 bytes may be stored in the "reserved" area in the header.

If the DATACLASS indicates that encryption for B2B purposes is required, the token name of the public key will need to be obtained. The token name of keys in the public key data set however is also 64-bytes in size and is stored in the DATACLAS. A unique DATACLAS for each public key used is provided.

Also, one additional override may be allowed. In the rare situation where there are multiple key entries (e.g., because of a data center merger or a requirement to ship tapes to another party with a specific key-name that matches an existing key-name) the ability to specify by unique key ID which key should be used is provided.

If it is found that encryption services are to be performed, the encryption control block may be updated. An anchor to all control blocks is maintained. If this is the first time this specific Unit is being used, a new control block is built and added to the chain. Otherwise, the existing control block is being re-used. Once the control block has been found or created; it will also be anchored in the Unit Control Block (UCB) extension itself. This allows the I/O intercept to find the control block quickly and easily. If a "retired key" is selected however, the job may be failed or a request may be issued asking for the correct key name to be used. The encryption control block may be defined as follows:

| Field name | size | Usage |
| --- | --- | --- |
| UCB-Numb | 4 | UCB number |
| Next UCBCB | 4 | Address of next UCB-CB |
| Addr-IOCB | 16 | Address of the Device I/O Control Block |
| Flag-1 | 1 | Misc flag byte |
| | X'80' | Encryption services are needed |
| | X'40' | UCB-CB has been fixed |
| | X'20' | |
| Flag-2 | | Misc flag byte |
| Key-label | 64 | ICSF key-label that should be used for encryption services |

With respect to tape I/O processing (output), the encryption system traps the data before it gets written, encrypts it, and then causes the encrypted data to be written. The encryption system may intercept the WRITE event in Start I/O (SIO) processing. The system finds the control block built by OPEN and verifies the buffers are adequate for processing this channel program. If not, then new buffers are added to the buffer pool for this file. Each write event is updated with a corresponding address in a corresponding encryption buffer. For each complete block processed, the encryption application is invoked to encrypt the data into the corresponding encryption buffer. When the end of the channel program is found, the I/O operation is re-driven with the updated encrypted buffer. Encryption buffers that have been used are marked as being in use. When the I/O completes, the system trap then marks the buffers as no longer in use. This allows for the unpredictable I/O logic of certain utilities. The encryption low-level I/O intercept will call the encryption application services passing the address and length of both the input and output buffers and the address of the Encryption Control Block (which will have information related to which key should be used and what type of encryption services are required).

The system detects encrypted tapes and dynamically decrypts them. During tape OPEN processing, the system verifies that there is an entry with the key name from the tape label (user label header), and that when used to un-encrypt the table name (also in the header) the table name matches what was used. If it does not, a check of the encryption database is performed to see if there is another match of the same key name and that encryption will be used again. Either a successful un-encryption of the table name will be performed (in which case the correct encryption key has been found) or the table will be exhausted (in which case the OPEN will be failed). The encryption utility calls the encryption application to retrieve the internal token during these attempts. Once the correct key is located, the intercept then acquires the buffer(s) needed for decryption and builds a control block containing the pointer(s) to the buffers(s) and the internal token to be used in the decryption process. If a key was not located, the OPEN is failed. This prevents the application from failing because of bad data being returned to it from the encryption application. A similar process to OPEN/OUTPUT may be performed to insure that an control block is present and anchored off the Unit Control Block extension itself.

During tape open processing for in-house encryption, the encryption OPEN exit detects a modified data header and then reads the 8 UHLs and pass the data to the Encryption Utility (106). From here, the Encryption Utility calls other encryption modules to determine which encryption subsystem should be used to decrypt the data on the tape and then insure that the Encryption Control Block is updated with the correct information to allow the data to be decrypted. The Encryption Application (104) modules call/linked by it will insure that the best-fit encryption address space is used ("best fit" would be the same encryption address space that created it; next "best fit" would be an encryption address space at the same release level; third "best fit" would be an encryption address space at a different release level that could still decrypt the data). Once the "best-fit" encryption address space has been identified, an attempt to decrypt data stored in the user header labels will be performed to insure that the correct key is being used. Once everything has been checked out and it is known that a decryption operation can be successfully performed, then the Encryption Control Block will be updated and control returned to the OPEN exit and OPEN Processing will be allowed to complete. If the key needed to decrypt the data cannot be found, the OPEN exit will cause OPEN processing to fail and the OPEN will not be allowed to continue.

With respect to tape I/O processing (input), the system traps the data after it gets read, decrypts it, and then passes the decrypted data back to the reader. The system may catch the READ event in Start I/O processing. The system finds the Encryption Control Block built by OPEN and verifies the buffers are adequate for processing this channel program. If not, then new buffers are added to the buffer pool for this file. Each READ event is updated with a corresponding address in a corresponding encryption buffer. When the end of the channel program is found, the I/O event is re-driven with the channel program pointing to the encryption buffers. Encryption buffers that have been used are marked as being in use. When the I/O completes, the system trap processes the blocks just read. For each complete block read, the encryption application decryption service is invoked to decrypt the data into the user's original buffers. The system then marks the encryption buffers as no longer in use. This allows for the unpredictable I/O logic of certain utilities.

With respect to CLOSE processing, during CLOSE, the encryption intercept sends notification back to the encryption utility along with any statistics that might have been gathered. The encryption intercept then tears down the structure that was used to manage the encryption or decryption process that was just completed. This includes clearing the field in the Unit Control Block extension that points to the encryption encryption control block. This prevents the accidental re-use if the next OPEN intercept is somehow missed and I/O takes place. Also, during CLOSE processing for both INPUT and OUTPUT, a check will be performed to insure that any relevant tape management systems have the correct encryption key index number.

If the user wants to delete a key, there are preferably no rules defined that call for that key name. The system queries SMS to see if the relevant key name is currently in use. If not, then the system turns on the "retired flag" indicator in its database. This prevents the key from being used for encryption going forward, but will still allow the key to be used to un-encrypt any existing files.

An ancillary process may also be provided in which the system queries the tape management system to look for any active tape files that were encrypted using the specified key. If the tape management system does not find any active tape files encrypted with the specified key, the "eligible to be deleted" indicator is turned on. When both the "eligible to be deleted" indicator and the "retired flag" are both on the key may then be deleted from the encryption database. Without a tape management system, a simple double-question to the user will be executed and the key deleted.

When two data centers containing encrypted tapes are merged, the encryption key table from one data center is exported from the one encryption system and imported into the other encryption system. The import process assigns new key ID numbers to the imported encryption database records where the key ID would duplicate an ID in the existing key table. The system generates a control file describing the old key ID and the new key ID that was assigned. This control file is taken in by a merge application when the actual records are being copied from the importing center into the target center. The application updates the records as they are being merged in. If the client performs the merge before importing the encryption key table, an update should be performed for the volume ranges that were merged in. For tape management, appropriate update commands should be created to perform the key ID changes.

As the encryption system should trap all OPEN calls made by any process or application running on a system where the encryption system is active, it is preferable that the encryption system make a quick determination as to whether or not it must participate in the processing of file information at the Start I/O level. Also, when the encryption system determines that it must participate, it must also quickly determine the information required by that participation. As this information should be persistent across restarts of the encryption system, this information should be stored in persistent storage. However, while a persistent storage mechanism is preferable for retaining information over time, it may be desired that the implementation of that database facilitates lightweight and quick responsiveness characteristics.

For these and other reasons, according to one specific embodiment, the encryption database may be implemented using z/OS DIV (data-in-virtual) facilities. DIV processing uses a pre-allocated linear file as the persistent storage mechanism, but the I/O subsystem used to access this persistent storage is basically the same as that used by the z/OS operating system for virtual storage paging operations. This is considered to be the fastest data access method available in the z/OS environment.

By using DIV facilities as the database mechanism, one can view the database as a collection of control blocks chained together to create database structures and hierarchies without the programming overhead of creating and maintaining a more traditional database. The operating system basically "pages-in" data from the underlying pre-allocated linear file as virtual storage pages mapped to that file are touched, and "pages-out" any pages modified as needed, all without the encryption system having to perform any database calls or perform any special I/O on its own. Basically, accessing the database runs at virtual memory speeds. This approach may provide the fastest possible mechanism for a database backed by persistent storage, and at the same time the persistent storage can be shared across multiple systems.

Tapes destined for use on any system that does not share the same encryption application and dataset as the system creating the tapes (such as in B2B situations) are preferably secure and yet somewhat self-defining in such a way that allows remote sites to securely yet easily read the encrypted data. To accomplish this, these tapes are encrypted under a single-use, randomly-generated symmetric key. The symmetric key itself is encrypted and placed on the tape using an asymmetric key technology. The receiving site need only decrypt the symmetric key found on the tape by using the private key of an asymmetric key pair, and then by using the symmetric key the site can readily decrypt the remaining data on the particular tape file.

Asymmetric cryptography involves encryption algorithms requiring two separate and unique keys (called a key pair). Using these algorithms, data encrypted with one key can only be decrypted using the other key in the key pair; the same key used to encrypt data cannot be used to decrypt the data. Because of this characteristic where data cannot be decrypted with the same key that was used to encrypt the data, the key used to encrypt data can be shared and even made public. The other key in the key pair remains secret (private) in order to protect the encrypted data. Hence, these algorithms are generally grouped into a category called "Public Key Cryptography."

Since asymmetric key cryptography facilitates secure information exchanges through published keys (public keys), the public key that is selected to encrypt data is preferably the public key of the entity or person with whom secure communication is intended. Otherwise, this methodology is open to spoofing where a middleman could intercept communications and substitute their own public key for the intended public key and thereby this middleman could read messages not intended for them to read.

To deal with this issue, public keys are generally wrapped into something called a "digital certificate." These certificates contain information about the owner of the public key. Further, there are protocols, standards and service providers who act as trusted third parties capable of verifying that a digital certificate is authentic and it's owner is who they say they are.

A digital certificate that is supposed to be from a specific person or entity can be verified as authentic, and then used to perform asymmetric encryption that would result in cipher text that is only decipherable by the actual owner of the certificate.

On the mainframe, digital certificates are handled by mainframe certain security products such as Top Secret (TSS), ACF2 or RACF. All of the information found within a digital certificate, including information about the owner as well as their public keys are stored in the security-product-specific databases, and this information is retrievable by authorized users and applications. When generating a new public key/private key pair on a mainframe, a site will generally use a service found in each of the above mentioned security products. This service will automatically generate a new public key/private key pair and will encapsulate that into a digital certificate and store it in its database. In this situation, the digital certificate contains both the public and private keys, and may be used to decipher information that has been encrypted using its public key. These certificates can then be exported into a form that may be shared publicly, meaning a form that only contains the public key and not the private key. Any mainframe site that needs to communicate securely with the originator of an exported digital certificate can obtain that certificate and add it into their own mainframe security product's database, and from there applications can reference the digital certificates for encryption as needed.

To securely and properly handle digital certificates, these security products store the certificates as resources owned by specific users. Certificates are added by or on behalf of a user by a security administrator and are available only to that user. Further, these certificates are stored into a structure known as a "key ring." One can think of a key ring like a key ring one might carry in one's pocket where one may have many keys on a ring and where each key opens a different lock. The digital certificate key ring concept is similar. It is basically a collection of keys (digital certificates) that the holder has in his possession. A user could have multiple key rings for storing and grouping digital certificates.

Therefore, in order to use a specific digital certificate on the mainframe, the certificate resides on a key ring that is associated with the user trying to use the certificate. To identify which certificate to use in any given situation, the user specifies which key ring the certificate is on as well as which certificate on the ring is to be used. This is done by referencing key rings by a name that the user selected when the key ring was created. This name can be 1 to 237 characters long, and is unique to all other key rings owned by the user.

Digital certificates also are given a name when they are created (that is, the original certificate that contained both the public and private keys). This name, known as its "label," may be 1 to 32 characters long and is how individual certificates on a ring are identified. A specific digital certificate is therefore identified on the mainframe by: user, key ring name, and digital certificate label (name).

With respect to the use of asymmetric key cryptography in creating encrypted tapes destined for an external site, such as a B2B partner, the site to receive the encrypted tape (System A) generates a public/private key pair to create a digital certificate if necessary, and stores the private key portion of that key pair into the encryption application. That key pair is connected to a key ring. The certificate is then exported and sent to the site that will be creating the encrypted tape (System B).

System B adds the certificate from System A into its security database and connects the certificate to a special key ring that has been created specifically for the originator's encryption system. A user or process on System B would then create an encrypted tape by specifying an SMS dataclass that has been altered to reflect the use of public key encryption as well as the certificate label of the digital certificate that was sent from System A.

During the creating of a tape on System B using a properly structured SMS dataclass, the encryption system will query the security system for the certificates on its key ring and will extract the public key from the proper certificate (based upon the label specified in the SMS dataclass definition). The encryption system will also generate a new symmetric key to be used to encrypt the data before it is written onto the tape. The public key will be used to encrypt this symmetric key, and that encrypted symmetric key will be written to tape using standard user header labels (the certificate label name will also be written out in a user header label in clear text). Once these user header labels have been written, the application can begin writing data to the tape, which the encryption system will intercept and encrypt before placing the data on tape.

When the encrypted tape finds its way back to System A, the encryption system will intercept any attempts at reading the tape and will read in the certificate label and encrypted symmetric key from the user header labels. Using the certificate label, the encryption system will query the security system for the certificates on its key ring and will look for the certificate that matches the label. This is preferably the original certificate that contained both the public and private keys, and since this was added to the encryption application, the security system should also have the encryption key label as well.

The encryption system will use the encryption key label obtained from the security system to call the encryption application and decrypt the encrypted symmetric key. This symmetric key will then be used to decrypt the data on the tape as it is read by the application.

Key rings are a collection of digital certificates (keys), and on the mainframe key rings belong to specific users (a user can own zero, one or more key rings). The certificates (keys) on one user's key ring are not accessible to any other user. This has implications on how certificates and key rings are organized and accessed by the encryption system. The encryption system will several options that determine how key rings will be referenced by the encryption system during the creation or reading of encrypted tapes. The options are the same for creating and reading encrypted tapes, but the option selected via the encryption system configuration parameters for creating tapes may be different from the option selected for reading tapes. For example, a site may want to place all certificates that will be used in creating encrypted tapes for B2B under a key ring that is associated with the encryption system started task user ID, but may want to require that users reading encrypted tapes show ownership by requiring that the certificate be on a key ring that is owned by the user accessing the tape.

In a first option, the encryption system will look for the certificate it needs by accessing the key ring under the user ID that the encryption system started task address space is running under. The option may be used for a tape creation processes. If selected for reading tapes, the process is basically reversed so that the user header labels are read to get the certificate label and the encrypted symmetric key. The label is used to select the appropriate certificate which is then used to decrypt the symmetric key. During the initialization of the encryption address space, the encryption system will query the security system for all certificates on the key ring that is owned by the user ID the started task is running under. The encryption system will cache these for performance, where they may be referenced as needed.

According to the second option, the user ID that owns the key ring is not the same as the ID of the encryption address space and is also not the same as the user who is accessing the tape. Under this option, a special user ID is established as the ID that will own the encryption key ring, and that user ID is supplied to the encryption system via its configuration parameters. When encryption is initialized, its key ring management subtask will switch over to the security identity of the ID specified in the configuration parameters, and therefore the encryption process will be limited to the key ring(s) owned by that special ID. As an example, this option may be useful in testing situations where it is easier to manipulate key rings and certificates under an ID other than the ID created for the encryption system started task itself, such as the ID of the systems programmer performing the tests.

According to a third option, the requirement for having an encryption key ring with the required certificates is pushed out to the end user running the tape job. Whether this option is set for tape creation or for reading tapes, the job/process must be running under a user ID that owns an encryption key ring and the needed certificate must be connected to that key ring. This option gives protection against unauthorized creation or reading of encrypted tapes, but will perform more slowly than options 1 or 2 for the simple reason that the user's key ring must be accessed each time an encrypted tape is used. Under options 1 and 2, the key ring is enumerated and the certificates are cached during the initialization of the encryption address space, but under this option no caching is possible and therefore the security system must be queried every time a certificate is needed.

According to a fourth option, the encryption system will look for certificates both under a key ring owned by the ID that the encryption started task is running under as well as under the user ID that the tape job is running under. The search order will also be configurable, but for performance reasons it is preferable to check the cached certificates that belong to the encryption started task ID and then only if the certificate is not located in this cache would the encryption system check the key ring for the user running the job. Optionally, the encryption system could be configured to check the user's key ring first, and fall back on the cached certificates only if the certificate is not located on the user's key ring.

According to a fifth option, the cached key rings would be associated with a user ID other than the ID that the encryption started task is running under.

In certain embodiments, startup parameters and controls for the encryption system come from the SMS DATACLASS descriptor field and/or from the STARTUP parameters fed to the encryption system address space(s). The parameters may be broken down into four categories: (1) startup options; (2) dynamic options; (3) symmetric keys; and (4) key rings.

Another place where input may come from is the DATACLASS descriptor field. The syntax that will be looked for and accepted falls into two categories: (1) simple symmetric key usage for in-house, disaster recovery, and long-term storage; and (2) business-to-business or division-to-division transfer using public/private keys. For the first (symmetric key usage), the format may be as follows: BTE=(BTE Token Name) or BTEn=(BTE_Token_Name) when a specific BTE address space other than "1" is to be used. For the second (B2B tapes), the syntax becomes a little more complicated and may be shown as follows: BTE=(RSA:DS_label, algorithm) or BTEn=(RSA[m]:DS_label, algorithm).

The database used by the encryption system may be a Data-In-Virtual (DIV) file mapped to a VSAM linear dataset. The first 4 k and last 4 k of the DIV may be a signature area. After the first 4 k signature, there may be nn number of 4-Meg "cells." The number of cells may be defined during the initialization and should be at a minimum equal to the total number of encryption system address spaces that will run across the various platforms plus one additional cell.

The first cell is a common-cell. It contains the actual key information, which includes multiple dataset keys created and stored for future use. Thus, the number may be quite large. However, this cell will only be updated when a new key is being added; which will only occur if an encryption system address space is started that has a new key in its parameter list or some existing keys have expired and new ones need to be generated.

Each encryption system address space will be assigned a unique cell to maintain its own statistics. This will allow an OPEN event to take place without having to wait for any update of the DIV itself. When a CLOSE operation takes place, the statistics will simply be updated within its own DIV cell and then periodically (e.g., once every fifteen minutes) each encryption system address space will perform a DIV RESET for its own cell. This way, the actual linear database will be current on statistics within the predetermined period and will always be completely current in terms of key definitions.

The bootstrap or backup may be a VSAM linear file. Every update to the common cell will result in the backup common cell also being updated. However, the individual encryption system address space cells will not be updated on the backup linear VSAM file every fifteen minutes like the primary, but only at longer predetermined periods (e.g., once per day). This will prevent excessive updates to the backup linear VSAM file. The advantage is that the recovery procedure in case of a damaged or corrupted database would be to shut down of all encryption system address spaces; rename the backup linear VSAM file to the primary name; allocate a new backup linear VSAM file; and restart all encryption system address spaces.

Various encryption algorithms may be supported by the encryption system. Any runtime limitations are based upon algorithms supported by the level of z/OS, encryption application services, and/or the available cryptographic co-processors. Additionally, only algorithms where the encryption application supports storing their keys in one of its databases are supported for encryption purposes (B2B decryption may not have this same requirement as long as the version of the encryption application installed and running on the system supports invoking the decryption routine using clear-text keys).

When running in "FIPS-mode" the following algorithms will be supported for data encryption: TDES-128, TDES-192, AES-128, AES-192, AES-256.

When running in "non-FIPS-mode," in addition to the algorithms listed under "FIPS-mode," these additional algorithms will be supported: DES-64.

Additionally, the encryption system may support the RSA Public Key/Private Key algorithm to be used in B2B tape situations. For these tapes, one of the above algorithms may be used to encrypt the actual data, and the encryption key used for the data will itself be encrypted using RSA. That encrypted key will be placed onto the encrypted tape to facilitate reading the tape in a remote site that does not share the same encryption datasets. RSA is not a FIPS-approved encryption algorithm (it is approved for creating digital certificates and for digitally signing documents). However, RSA can be employed in key exchange protocols until such time as a FIPS is approved to cover key exchanges.

Among other things, the encryption system brings two new capabilities to the existing z/OS cryptographic services and facilities that help solve the problem of creating secure tapes destined for offsite storage or processing. One capability is the application of certain technologies that allow the interception of low-level I/Os at the device unit level. The second is the ability to generate, apply and manage cryptographic keys used in the encryption and decryption of data on tape media. The combination of these two new capabilities makes the task of creating and maintaining encrypted tapes easy and automatic.

Key management involves all of the processes of generating, storing, tracking, selecting, retiring and cleaning up of the cryptographic keys that participate in the encryption and decryption of data on tape. The system implements two key management approaches to address two very unique uses of tape. The first is a key management scheme to address tapes that may or may not go offsite and are basically used for purposes that are internal to a customer's business. This use would include things such as tapes to be sent offsite for disaster recovery purposes. For these tapes, the assumption is that any system that might be used to read an encrypted tape will share or have a backup copy of the z/OS repositories where the cryptographic keys would be stored. Because it is assumed that these repositories are available at the time these tapes are read, there is no need to create "self-contained" tapes where the encryption key might be stored on the tape itself in some secure fashion. And, any encryption key stored within these databases would be encrypted themselves so that the encryption keys themselves are never seen in clear text.

The second use of offsite tape involves situations such as B2B relationships. These tapes are destined for systems that are not capable of sharing or maintaining mirror copies of the cryptographic key repositories. For these tapes, it is preferable that the encryption system generates "self-contained" tapes, meaning that the cryptographic key that is needed for decryption is stored on the tape in a secure fashion.

Depending upon the intended use of an encrypted tape (e.g., internal or B2B), symmetric keys will be managed within the encryption system, for example, in the encryption databases in slightly different ways. Only symmetric keys that can be generated and stored in the encryption database are eligible for encryption (this implies that for encryption, the system only supports algorithms that are supported by the encryption datasets, which may not be the same as the algorithms encryption services could support using clear-text symmetric keys). Symmetric keys for internal tapes are stored, retained and managed in the encryption dataset. Symmetric keys for B2B tapes are temporarily stored in the encryption database where they will remain for a period of time as specified by the user during the installation and customization of the encryption system after which these temporary keys are removed from the database (during this period, the last file on an encrypted tape may be mod'ed, but once this period has been exceeded no further mod'ing of the encrypted tape will be possible). For decryption of internal tapes, only keys already stored in the encryption dataset are eligible whereas B2B symmetric keys are read off of the encrypted tape and will either be temporarily stored in the dataset or encryption database, or used in clear-text form to perform decryption.

For B2B tapes, the encryption system will generate a new symmetric key using a FIPS 140-2 certified random number generator for each encrypted file. This clear-text symmetric key will be encrypted under the public key of the B2B partner and stored on the encrypted tape in user header labels. The symmetric key will also be encrypted using the encryption services master key, stored in the encryption database and referenced during the encryption of the data as it is being written to the tape device. This key will remain in the encryption database for a period of time to support applications that may want to "mod" onto the end of the last file of the tape.

Whether or not a tape is to be encrypted and is or is not a B2B tape is determined by special encryption system information found in the dataclass definition associated with a tape file at creation time. The public key of the B2B partner is identified via the dataclass by its digital certificate's "label" (for B2B, the B2B partner's Digital Certificate must be added to the z/OS security system such as ACF2, Top Secret or RACF). The symmetric key algorithm used by the encryption system for these B2B tapes is also determined by information found in the dataclass definition.

To read these B2B encrypted tapes, the encryption system will read the encrypted symmetric key, the original digital certificate label, and the symmetric encryption algorithm from the user header labels, and will then use the digital certificate label to gain access to the private key in the receiving system's security product. Using this private key, the encryption system will decrypt the symmetric key and will use that symmetric key to decrypt the remaining encrypted data as it is read off of the tape for that file.

The security product on the receiving site does not have to be the same as the security product of the site that created the tape. For example, ACF2 could be running on the site that created the B2B tape while Top Secret is running on the site that is reading the tape.

Like the digital certificates for B2B tapes, the symmetric key to be used during the encryption of internal tapes is also identified through information the user will place in the dataclass definition. Unlike B2B tapes, however, the symmetric key used to encrypt the data on the tape is pre-defined. In pre-defining symmetric keys for internal tapes, the algorithm to be used is also defined (the algorithm is not defined in the dataclass as is the case for B2B tapes).

Whereas B2B tape files are each encrypted with a single-use randomly generated symmetric key (with this key being stored on the tape itself), internal tapes are encrypted using multi-use symmetric keys. As the symmetric keys for internal tapes are stored and retained in the dataset for as long as the encrypted tape file exists, using single-use keys could quickly fill up the dataset.

These symmetric keys are stored in the dataset rather than the encryption system database to ensure that the keys remain "operational" for as long as they are needed. When generated by encryption services, these keys are returned encrypted under the encryption application master key which makes them "operational" for use in calls to encryption services. However, if the master key is changed these keys are re-encrypted under the new master key. This would not happen if the keys were stored in the encryption system database, but encryption services will automatically re-encrypt these keys if they are stored in the dataset.

Using multi-use keys to encrypt multiple files and multiple tapes does increase the amount of data that is exposed should a key be compromised. For that reason, it is preferable that multiple-use keys expire on a regular basis and are replaced with new keys to limit the exposure of a compromised key. An option will be available for each symmetric key defined to allow the key to be regenerated on a periodic basis (e.g., weekly, monthly, yearly, etc.).

For the encryption system, the site identifies tape files to be encrypted via special information placed in the appropriate dataclass description field. Whereas for B2B tapes the digital Certificate label is encoded, for internal tapes the site will identify the key to be used for encryption by a key label. The encryption system has its own database that it uses to track and maintain the individual symmetric keys it generates for these internal tapes. The encryption system key name counterpart to the dataset key label can be much more user-friendly (an encryption system key name can range from a 1-to-32 character value as determined by the encryption system administrator). For any given encryption system key name defined by the administrator, the encryption system will generate, track and maintain all past, present and even some future symmetric keys and store these in the encryption services dataset. As symmetric keys expire under the control of the encryption system, the encryption system database is updated to reflect a new current key to be used for any future encryptions under the encryption system key label. The expired key is retained by the encryption system and encryption services until the last tape encrypted with that expired key is no longer needed.

For any given encryption system key name there will be one underlying symmetric key that is in the "active" state. This is the key that will be used for any application that writes to a tape where the dataclass has specified the encryption system key name. In addition to this one "active" key, there will be six keys that are in "pre-activation" status. These keys will reflect the next six keys to be used (in chronological order) over the next six expiration periods for the key entry. If a key entry is set to expire on a weekly basis, these keys would represent the keys that will be used over the next six week period. As the "active" key expires, the active key will be deactivated and the next "pre-activation" key will be placed into "active" status. One new key will be generated to maintain the six future generations of the key.

There may be any number of keys under each specific encryption system key name that are in the "deactivated" state. These represent keys in the encryption services database that were used to encrypt tapes in the past under the specific encryption system key name, and are referenced anytime an application mounts and reads one of these tapes. To ensure that keys do not remain in the databases beyond the lifecycle of the tapes, the encryption system will automatically remove these deactivated keys when the tape management system flags the last tape encrypted under these old keys to be in a scratch tape.

To read internal encrypted tapes, the encryption system will first read the encryption system key table name, the encryption system key label, key index, and symmetric encryption algorithm from the user header labels. The encryption system will then query the encryption system database to check the validity of this information against its own database, and if this information is valid it will extract the dataset key label from the encryption system database. This dataset key label identifies the specific symmetric key that is needed in order to decrypt the remaining data as is it read from the encrypted tape file.

The encryption system key database keeps track of all keys that the encryption system might store in the dataset, including temporary keys generated for single-use encryption of B2B tapes. The encryption system key database will be made up of a series of assembler control block structures that have been mapped to a data-in-virtual data space. Through anchor control structures found at the low-addresses of the data space, the encryption system key database structures may be accessed.

The encryption system key database begins with a Key Header (KHDR). This control block represents an encryption system key table, and all key entries and key instances that belong to the key table are accessible through chain pointers that begin with the KHDR, either by traversing down through the Key Entry structures or the Key Index structure. There will be at least one KHDR in the encryption system database (known as the primary table) but there may be one or more additional KHDR structures that are chained off of the primary KHDR (the first KHDR in the KHDR chain is the "primary" table).

Only keys found in the primary table are eligible for encryption services in creating encrypted tapes. Any secondary key tables represent keys that have been merged from other systems that did not share the same database. For example, when merging two or more z/OS data centers into one data center, merging the databases together will result in secondary key tables that represent the old keys that may still be associated with encrypted tapes from the merged data centers. As the encryption system key table name as well as the key label is stored in header labels on the physical tape, the encryption system will lookup the proper key for decryption by accessing keys under the appropriate key table.

There is one Key Index control block (KNDX) for every key table as represented by the Key Header control blocks (KHDR). Every symmetric key produced by the encryption system and stored in the dataset is given a unique 4-byte key index value before being stored in the encryption database.

There is an entry in the key index reserved for tracking temporary keys. These are the symmetric keys that have been used for B2B tapes where the system has yet to remove the keys from the dataset. The system will leave these B2B symmetric keys "in-place" for a period of time, which allows the user to re-read the tape and to "mod" onto the end of the tape using the same encryption scheme and key. Once the encryption system removes these temporary keys, however, these B2B tapes cannot be "mod'ed" and can only be read by the site that has the private key that can decrypt the symmetric key found on the physical tape.

The Key Entry control block (KENT) represents a single encryption system key label that would be referenced in a dataclass description field. The purpose of this control block is to pre-define symmetric keys for internal tapes and to maintain a relationship between the key label specified in the dataclass description with the current key to be used for encryption, as well as maintaining a relationship to every key that has ever been used under that key label and that may still be referenced by readable tapes. Key Entries are defined by the administrator, who also assigns a specific symmetric key encryption algorithm to each of these pre-defined keys.

The Key Instance control block (KINS) represents a single, unique symmetric key that the encryption system has stored in the encryption dataset. All keys generated for a specific key entry (KENT) that are still in the dataset are found in a chain off of the KENT.

When the system generates a new key to be stored in the dataset, it assigns it a unique key index value, which is stored in the KINS control block and is also passed off to the tape management system to be stored in the tape catalog. For quick lookup by the information that is both stored in the tape catalog as well as on the tape headers, the encryption system will maintain a second set of chain pointers for each KINS to maintain chains of KINS control blocks from the view of the Key Index (KNDX). This is in addition to the chain of KINS control blocks that groups key instances under a specific key entry (KENT).

The cryptographic algorithms supported by the encryption system will be determined by a single module called the cryptographic support module. The external interface into this module is generic and not specific to any particular encryption/decryption algorithm. All logic for setting up and invoking all of the supported algorithms is contained within this module, including any key management requirements that deal with encryption services or any other external database. This means that outside of this one module, all system logic is generic and is not aware of any particular cryptographic methodology.

Some of the major components in the encryption system include the encryption address space or encryption utility, the intercepts. encryption system address space "owns" the encryption system database and provides database update services to the other components. The encryption system database retains information on the symmetric keys in use for in-house encryption and performance statistics. The encryption system address space also interfaces to the MVS systems logger facility to create a record of encryption/decryption activity. The encryption system database will be recoverable through a mirroring facility.

The tape OPEN intercept will identify tape files to be encrypted by calling the SMS ACS routines to see if this data set was assigned to a Dataclass which has been set up to request encryption (as indicated by a unique character string in the Dataclass description field). When the request encryption character string is found a control block will be created (if it does not already exist) and flagged to indicate the type of encryption necessary. The I/O intercept will check this control block and dynamically encrypt the data in a separate buffer that is written to the tape. User header labels are written before each encrypted file to include the details on the type of encryption. When creating B2B tapes, the system interfaces to services provided in eTrust ACF2, eTrust Top Secret or RACF to create a digital certificate and to encrypt the data encryption key so that it may be included in the user header labels on the tape. The I/O intercept will interface to encryption callable services to perform the type of encryption requested. For B2B processing, the data encryption key is also temporarily saved in the encryption database to support "MOD" processing to the tape.

For in-house tapes, the symmetric key will be stored in the encryption services database (the dataset) which must therefore be available to recover the key when an encrypted volume is presented for read processing. The key to be used is obtained using information from the user header labels and the encryption system database.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention.

What is claimed is:

1. A method of encrypting data, comprising:
   determining whether a data storage device will have one or more encrypted files, wherein determining whether the data storage device will have one or more encrypted files comprises:
      using a first intercept of an operating system associated with the data storage device, wherein the first intercept is configured to interrupt control of an OPEN/READ instruction of the operating system; and
      identifying at least one parameter associated with data to be stored on the data storage device;
   automatically setting, based at least in part on the determination of whether the data storage device will have one or more encrypted files, one or more device-level flags of the data storage device to indicate that the data storage device will have one or more encrypted files;
   monitoring the operating system associated with the data storage device for a first input/output event associated with the data storage device;
   if the first input/output event associated with the data storage device occurs,
      recognizing, using at least a second intercept, the occurrence of the first input/output event; and
      using the second intercept, initiating encryption of data being written to the data storage device;
   encrypting, using a device-level encryption process at the data storage device, the data using a data encryption key;
   encrypting the data encryption key using a public key and a master key, the master key configured to enable modifications of at least two files stored on the data storage device;
   storing the encrypted data on the data storage device;
   storing the public key on the data storage device; and
   storing the master key on a computer-readable medium external to the data storage device.

2. The method of claim 1, wherein the at least one parameter comprises a data storage job description.

3. The method of claim 1, wherein the at least one parameter is the name of a file to be stored on the data storage device.

4. The method of claim 1, wherein the one or more data storage device-level flags further indicates one or more encryption keys to be used in the process of encrypting data to be stored on the storage device, the one or more encryption keys comprising the data encryption key.

5. The method of claim 4, further comprising storing the one or more encryption keys in an encryption application dataset.

6. The method of claim 4, further comprising storing the one or more encryption keys in an encryption system database.

7. The method of claim 4, further comprising storing the one or more encryption keys in a first location, creating one or more encryption tokens corresponding to the one or more encryption keys, and storing the one or more encryption tokens in a second location, wherein the one or more encryption tokens provides an indicator of at least one characteristic of the one or more encryption keys.

8. The method of claim 1, further comprising generating the encryption of the data encryption key using:
   a public key; and
   an encryption services master key configured to enable modifications of one or more files stored on the data storage device.

9. The method of claim 1, further comprising determining, using at least a third intercept, whether the storage device includes encrypted data.

10. The method of claim 9, further comprising determining, using at least the third intercept, one or more encryption keys used to encrypt the data.

11. The method of claim 9, further comprising determining, using at least the third intercept, one or more encryption tokens associated with one or more encryption keys used to encrypt the data.

12. The method of claim 9, further comprising setting, using at least the third intercept, the one or more device-level flags of the data storage device to indicate one or more characteristics of an encryption application associated with the encrypted data.

13. The method of claim 9, wherein the first intercept comprises the third intercept.

14. The method of claim 1, further comprising monitoring the operating system associated with the data storage device for a second input/output event associated with the data storage device; and
   if the second input/output event associated with the data storage device occurs,
      recognizing the second input/output event, wherein recognizing the second input/output event comprises using at least a third intercept; and
      initiating decryption of the encrypted data stored on the data storage device, wherein initiating decryption of the encrypted data stored on the data storage device comprises using at least the third intercept.

15. The method of claim 14, wherein the second intercept comprises the third intercept.

16. The method of claim 1, further comprising:
communicatively coupling the data storage device to a second operating system;
monitoring the second operating system for a second input/output event associated with the data storage device;
if the second input/output event associated with the data storage device occurs,
recognizing the second input/output event, wherein recognizing the second input/output event comprises using at least a third intercept; and
initiating decryption of the encrypted data stored on the data storage device, wherein initiating decryption of the encrypted data stored on the data storage device comprises using at least the third intercept;
decrypting the encryption of the data encryption key on the data storage device; and
using the decrypted data encryption key, decrypting the data stored on the data storage device.

17. A data encryption system, comprising:
one or more memory devices collectively storing:
an operating system;
an encryption application operable to encrypt data to be stored in a data storage device, the encrypting by the encryption application being a device-level encryption process at the data storage device, the device-level encryption process comprising use of a data encryption key, the data storage device operable to store encrypted data and a public key;
an encryption utility operable to:
determine whether the data storage device will have one or more encrypted files, the determining comprising:
using an operating system intercept to interrupt control of an OPEN/READ instruction of the operating system; and
identifying at least one parameter associated with data to be stored on the data storage device;
automatically set, based at least in part on the determination of whether the data storage device will have one or more encrypted files, one or more data storage device-level flags to indicate that the data storage device will have one or more encrypted files; and
issue a second intercept, the second intercept operable to recognize the input/output event and initiate encryption of data being written to the data storage device;
a monitoring module operable to monitor the operating system for a first input/output event associated with the data storage device;
wherein the encryption application encrypts data after the second intercept recognizes the input/output event and before the data is stored on the data storage device; and
a key application configured to:
encrypt the data encryption key using the public key and a master key, the master key configured to enable modifications of at least two files stored on the data storage device; and
store the master key on a computer-readable medium external to the data storage device.

18. The data encryption system of claim 17, wherein the encryption application is further operable to:
encrypt data using at least one data encryption key; and
encrypt the at least one data encryption key using:
a respective public key stored on the data storage device;
a master key stored external to the data storage device and configured to enable modifications of at least two files stored on the data storage device.

19. The data encryption system of claim 18, wherein the at least one data encryption key is stored in an the encryption database.

20. The data encryption system of claim 18, further comprising an encryption database storing at least one encryption token corresponding to the at least one data encryption key.

21. The data encryption system of claim 17, further comprising:
a dataset associated with the encryption application, the dataset storing at least one encryption key returned by the first intercept; and
an encryption database storing at least one encryption token having information corresponding to the at least one encryption key.

* * * * *